United States Patent [19]

Moracz et al.

[11] Patent Number: 5,184,769
[45] Date of Patent: Feb. 9, 1993

[54] TOOLING AND METHOD FOR CONSOLIDATING A FILAMENTARY REINFORCED METAL MATRIX COMPOSITE

[75] Inventors: Donald J. Moracz, Garfield Heights; Gordon S. Doble, Shaker Heights, both of Ohio

[73] Assignee: Avco Corporation, Providence, R.I.

[21] Appl. No.: 793,267

[22] Filed: Nov. 13, 1991

Related U.S. Application Data

[63] Continuation of Ser. No. 661,543, Feb. 26, 1991, abandoned, which is a continuation of Ser. No. 385,737, Jul. 26, 1989, abandoned.

[51] Int. Cl.$^5$ .............................................. B23K 20/02
[52] U.S. Cl. ..................................... 228/121; 228/265; 228/190; 228/243; 228/44.3
[58] Field of Search ............... 228/121, 127, 190, 193, 228/243, 265, 44.3; 29/889.2; 416/241 B

[56] References Cited

U.S. PATENT DOCUMENTS

| Re. 25,441 | 9/1963 | Eyberger | 18/42 |
|---|---|---|---|
| 2,253,003 | 8/1941 | Whipple | 72/359 |
| 3,547,599 | 12/1970 | Muser et al. | 228/190 |
| 3,550,254 | 12/1970 | Greenspan et al. | 228/190 |
| 3,807,913 | 4/1974 | Brede, III et al. | 425/78 |
| 3,809,309 | 5/1974 | Batista | 228/44.3 |
| 3,936,277 | 2/1976 | Jakway et al. | 228/190 |
| 3,992,202 | 11/1976 | Dulis et al. | 75/222 |
| 4,087,221 | 5/1978 | Munson et al. | 425/78 |
| 4,301,584 | 11/1981 | Dillner et al. | 228/190 |
| 4,441,874 | 4/1984 | Kumar et al. | 425/78 |
| 4,732,314 | 3/1988 | Sakamoto | 228/190 |
| 4,782,992 | 11/1988 | Doble | 228/190 |

FOREIGN PATENT DOCUMENTS

| 0176386 | 4/1986 | European Pat. Off. | 228/190 |
|---|---|---|---|
| 3726793 | 11/1988 | Fed. Rep. of Germany | 228/193 |
| 7436209 | 5/1976 | France | 228/190 |
| 134284 | 8/1982 | Japan | 228/193 |
| 2198675 | 6/1988 | United Kingdom | 228/193 |

Primary Examiner—Samuel M. Heinrich
Attorney, Agent, or Firm—Edmund J. Walsh

[57] ABSTRACT

The tooling includes a central die member and an outer die member spaced thereabout to form an annular, draftless chamber for receiving a composite preform. An annular punch is received in the chamber for pressing the preform at an elevated temperature sufficient to consolidate and bond the preform into the desired composite. The tooling with the preform therein can be enclosed in a gas impermeable envelope (e.g., a steel can) and hot isostatically pressed at the elevated temperature to press the punch against the preform for purposes of consolidation. The coefficient of thermal expansion of the central die member is selected greater than that of the outer die member and the consolidated composite to facilitate removal of the composite from the draftless chamber.

7 Claims, 2 Drawing Sheets

TOOLING AND METHOD FOR CONSOLIDATING A FILAMENTARY REINFORCED METAL MATRIX COMPOSITE

This is a continuation of application Ser. No. 07/661,543, filed on Feb. 16, 1991, now abandoned which is a continuation of application Ser. No. 07/385,737, filed on Jul. 26, 1989 also abandoned.

FIELD OF THE INVENTION

The invention relates to tooling for consolidating a filamentary reinforced metal matrix composite wherein the consolidated composite can be readily removed from the tooling.

BACKGROUND OF THE INVENTION

In the manufacture of ring-shaped filamentary reinforced metal matrix composites, for example as illustrated in U.S. Pat. No. 4,782,992, a helical assembly of metal foil and filaments is disposed in an annular female chamber of a lower die and an annular male punch is pressed onto the assembly in a vacuum hot pressing device to consolidate the assembly and bond the metal foil and filaments into the desired ring-shaped densified composite. After consolidation, the ring-shaped composite is typically mechanically ejected at the high pressing temperature using one or more knock out pins.

Removal of the consolidated ring-shaped composite has presented problems, typically requiring a draft angle on the walls of the female chamber of the lower die. Removal can be especially difficult when consolidated ring-shaped composite has a small thickness after consolidation and lies deep in the female chamber. Vacuum hot pressing equipment without access to a knock-out pin has been used for pressing large ring-shaped composites; e.g., greater than eight inches in diameter, such that removal of the composite after consolidation is difficult.

It is an object of the present invention to provide tooling, such as a die set, for consolidating a filamentary reinforced metal matrix composite, which permits ready removal of the consolidated composite from the die set.

It is another object of the present invention to provide tooling, such as a die set, which permits use of a draftless female chamber in the lower die.

It is another object of the present invention to provide tooling, such as a die set, which permits ready removal of the consolidated composite without the need for ejector or knock-out pins.

It is another object of the present invention to provide tooling, such as a die set, which substantially prevents transverse or radial bulging of the preform during hot pressing.

It is still another object of the present invention to provide a consolidating method wherein the tooling, such as a die set, and a preform of the composite are cooperatively associated and enclosed within a gas impermeable envelope so as to allow hot isostatic pressing of the preform in the die set within the envelope.

SUMMARY OF THE INVENTION

The invention contemplates tooling for consolidating a filamentary reinforced metal matrix composite wherein the tooling includes a central die member and an outer die member spaced about the central die member in such a manner as to form an annular female chamber for receiving an annular preform. The tooling also includes an annular male punch received within the chamber and means for pressing the punch against the preform at an elevated temperature for consolidating the preform and bonding the metal matrix and filaments. Importantly, the coefficient of thermal expansion of the central die member is selected greater than the coefficient of thermal expansion of the outer die member and the consolidated composite such that the consolidated composite is readily removed from the chamber upon cooling to a lower temperature, e.g., ambient temperature, after hot pressing. The coefficient of thermal expansion of the central die member and the punch can be equal while the coefficient of thermal expansion of the consolidated preform can be generally equal to or greater than that of the outer die member to this end.

Tooling of this type allows the preform to be consolidated in the annular female chamber without having to provide a draft angle on the chamber or the consolidated composite; that is, the chamber can be draftless. Moreover, removal of the consolidated composite is facilitated to such a degree that there is no need to use an ejector or knock-out pin to free the composite after consolidation.

In addition, the dimensions of the tooling are selected in conjunction with the coefficients of thermal expansion to maintain radial (transverse) compression on the preform sufficient to substantially prevent radial (transverse) bulging of the preform under the temperature and pressure conditions of hot pressing (i.e., to prevent substantial radial displacement of the preform).

In one embodiment of the invention, the preform is disposed in an annulus positioned in the female chamber and made of the matrix material so as to become part of the consolidated composite.

In another embodiment of the invention, the preform is formed of alternating layers or tapes of metal foil and filaments.

In a preferred embodiment of the invention, the central die member comprises a nickel base superalloy (e.g., the known IN-100 superalloy) and the outer die member comprises a molybdenum alloy (e.g., the known TZM alloy) when the composite comprises silicon carbide filaments in a Ti-6Al-4V matrix metal. The punch may comprise the aforementioned nickel base superalloy or the molybdenum TZM alloy.

This tooling can be used in association with conventional vacuum hot pressing equipment known to those skilled in the art.

The present invention also contemplates enclosing the tooling with the preform in the annular female chamber in a suitable gas impermeable envelope; e.g., a mild steel can, and hot isostatically pressing the assembly to press the punch against the preform while they are enclosed within the envelope to consolidate the preform. After consolidation, the gas impermeable envelope is removed from the tooling and the consolidated composite, allowing subsequent removal of the consolidated composite from the die members. In this method, the central die member and the punch have a coefficient of thermal expansion greater than that of the outer die member and the consolidated composite to facilitate subsequent removal of the composite.

These and other objects and advantages of the invention will become apparent from the following detailed description taken with the following drawings.

DESCRIPTION OF CERTAIN EMBODIMENTS

Figure 1:
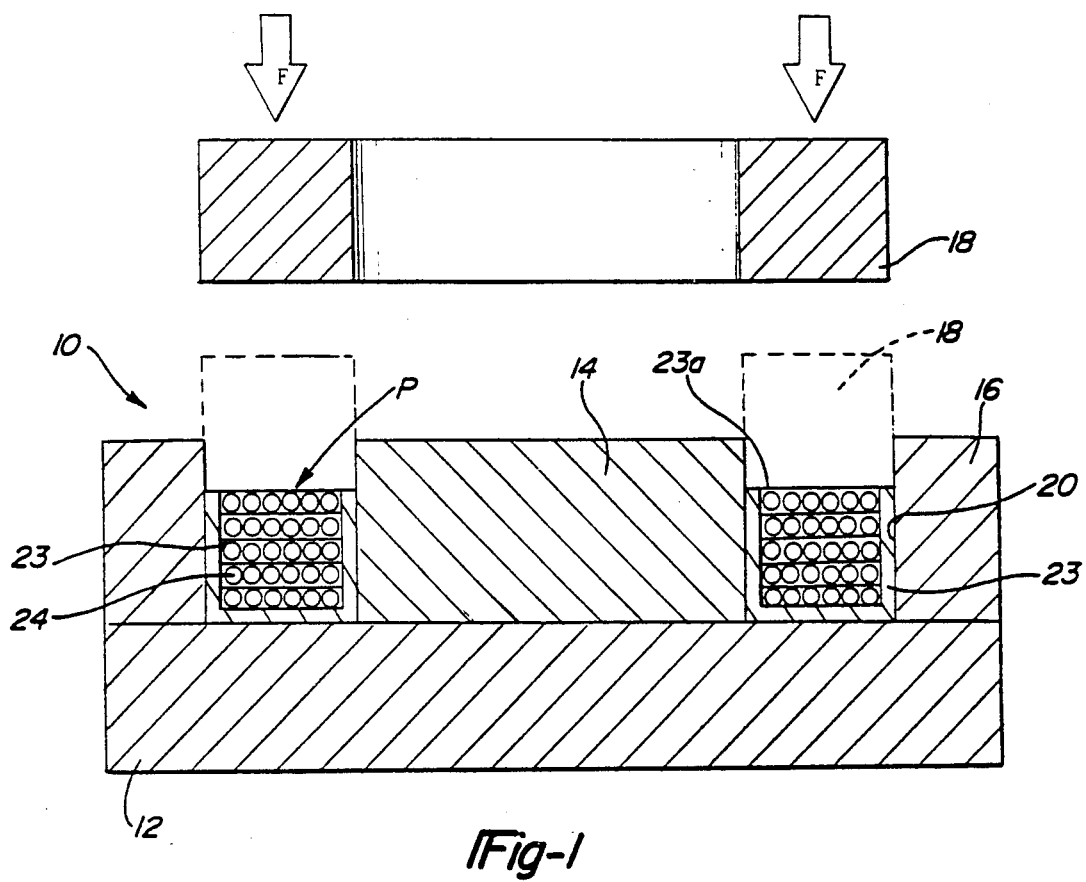
FIG. 1 is a schematic longitudinal cross-sectional view of one embodiment of the tooling of the invention.

Referring to FIG. 1, one embodiment of the invention involves tooling 10 including a base 12, an inner central die member 14, an outer die member 16 and an annular punch 18. The base 12 is in the form of a cylindrical slab and is made of molybdenum TZM alloy, a nickel base superalloy (e.g., the known IN-100 superalloy) or like material that is rigid and non-deformable under the temperature pressure conditions of pressing as will be explained hereinbelow. The coefficient of thermal expansion of the base material is not critical and does not have to be selected in any particular relationship (e.g., greater or less than) to the coefficients of thermal expansion of the central die member 14, outer die member 16 or punch 18.

The inner central die member 14 is in the form of a rigid, cylindrical slab having a diameter less than that of the base 12. The outer die member 16 is in the form of rigid annulus spaced about the central die member 14 to form an annular, draftless, female chamber 20 between the central and outer die members 14, 16 for receiving an annular preform P to be consolidated to form the densified composite C, FIG. 4. The preform P comprises alternate layers or tapes of metal matrix foil 22 and reinforcing filaments 24; e.g., as described in U.S. Pat. No. 4,782,992, the teachings of which are incorporated herein by reference. For example, the metal matrix foil 22 may comprise a helical foil tape of the well known Ti-6Al-4V (titanium - 6 w/o aluminum - 4 w/o vanadium) alloy while the filaments 24 may comprise SiC mono-filaments which are in the form of a helical tape. The flat-surfaced helical tapes of metal matrix foil 22 and filaments 24 are formed as taught in U.S. Pat. No. 4,782,992. The invention, however, is not limited to consolidating interspersed layers or tapes of matrix foil and reinforcing filaments. For example, plasma sprayed filamentary and other type of preforms can be consolidated in the context of the invention.

The metal matrix foil 22 ultimately provides a metallic matrix which may comprise metals and alloys of various types; especially titanium, titanium aluminides, and alloys.

The reinforcing filaments 24 can be any of many known composition, such as a silicon carbide, boron, coated boron, refractory metal or ceramic. The filaments may also be yarns of materials such as graphite, alumina or other ceramics. The filaments 24 are relatively high strength, generally have limited or low ductility compared to the metal matrix and reinforce the metal matrix to enable the composite article to withstand very high centrifugal forces under severe operating conditions.

The preform P is received in an annulus 23 having an open upper end 23a. The annulus 23 is made of the matrix metal and will become part of the consolidated composite C as will be explained hereinbelow.

In accordance with the invention, the coefficient of thermal expansion of the central die member 14 is selected to be greater than the thermal expansion coefficient of the outer die member 12 and the composite C to facilitate removal of the composite C after consolidation of the preform P. The coefficient of thermal expansion of the consolidated composite can generally be equal to or preferably greater than that of the outer die member 16. Moreover, the strength (e.g., the rigidity) at the high temperature of consolidation of die members 14, 16 must be greater than that of the preform P (and composite C). In a particular embodiment of the invention for consolidating the preform P (i.e., Ti-6Al-4V metal matrix and SiC monofilaments), the central die member 14 is preferably made of a nickel base superalloy (e.g., the known IN-100 superalloy) while the outer die member 16 is preferably made of the known molybdenum TZM alloy. The annular punch 18 is dimensioned to be slidably received in the annular chamber 20 for pressing the preform P and preferably is made of the nickel base superalloy (e.g., IN-100) but can also be made of the molybdenum TZM alloy. Preferably, the thermal expansion coefficient of the punch is equal to that of the central die member 14 and greater than that of the outer die member 16 and the consolidated composite C.

The dimensions of the central die member 14 and the outer die member 16 are chosen in conjunction with the coefficients of thermal expansion of the tooling components such that under the elevated temperature and pressure conditions of subsequent hot pressing, a slight radial (transverse) compression is exerted on the preform P sufficient to substantially prevent radial (transverse) bulging of the preform P during hot pressing. That is, the radial compression exerted on the preform P is sufficient to prevent substantial radial displacement of the preform during hot pressing to maintain the filaments 24 free of cracking and buckling.

In accordance with method aspects of the invention, the punch 18 is caused to press the preform P and annulus 23 in a direction parallel with the axes of the helical tapes of metal matrix foil 22 and filaments 24 at a suitably high temperature to consolidate and solid state diffusion bond the metal matrix foils 22 together into a dense metal matrix with the filaments 24 disposed and bonded in the metal matrix and with the annulus 23 solid state diffusion bonded to the metal matrix as well. This high temperature consolidation step can be carried out in a conventional vacuum hot pressing apparatus wherein the tooling 10 with the preform P in the chamber 20 is placed in the vacuum chamber of the apparatus and is heated to a suitable elevated temperature depending upon the metal matrix used. For the Ti-6Al-4V metal matrix foil 22, the temperature of the tooling 10 and the preform P is maintained at about 1525° F. A suitable pressing force (arrows F in FIG. 1) is exerted on the punch 18 to cause it to press the preform P against the base 10 which is rigid and non-deformable under the pressure and temperature conditions of the consolidation step. The pressing force is adequate to cause plastic flow of the metal matrix foil 22 to densify the preform P and to firmly solid state diffusion bond the filaments 24 in the metal matrix. The base 12 restrains the preform P against axial movement while the central die member 14 and outer die member 16 substantially prevent radial bulging of the preform P. To this end, the strength (e.g., rigidity) of the base 12 and die members 14, 16 is greater than that of the preform P (or composite C) at the consolidation temperature, whereby the die members 14, 16 do not deform during the consolidation step.

In accordance with the invention, the punch 18 is used to solely controllably press the preform P in the high temperature consolidation step described hereinabove. Differences in the thermal expansion coefficients of the die members 14, 16 are not used to generate a consolidation force on the preform. As mentioned hereinabove, the die members 14, 16 have dimensions designed or selected to exert a slight radial compression on the preform P to prevent radial bulging thereof under the temperature and pressure conditions of hot pressing.

Figure 4:
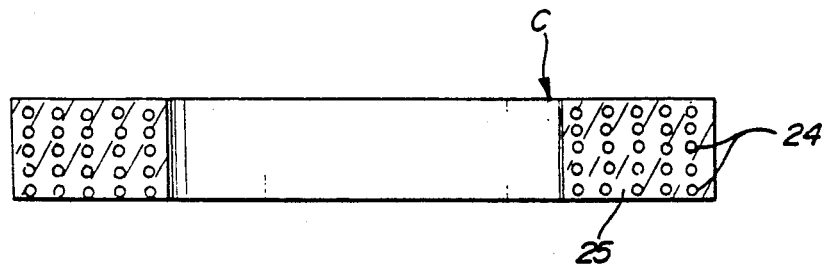
FIG. 4 is a cross-sectional view of the composite.

After the consolidation of the preform P into the fully dense composite C, FIG. 4, the tooling 10 and composite C are cooled preferably to ambient temperature with the punch 18 remaining in contact with the consolidated composite C. Upon reaching the lower temperature, the consolidated composite C is removed from the tooling 10 by withdrawing the punch 18 out of the chamber 20 and then removing the consolidated composite C. Since the coefficient of thermal expansion of the central die member 14 is greater than that of the outer die member 16, the central die member 14 will contract to a greater extent upon cooling than the outer die member 16 and the consolidated composite C, and the outer die member will contract less than the consolidated composite C. This allows ready removal of the composite C from the chamber 20 without the need for a draft angle on the walls forming the chamber 20 or on the composite C itself.

Figure 3:
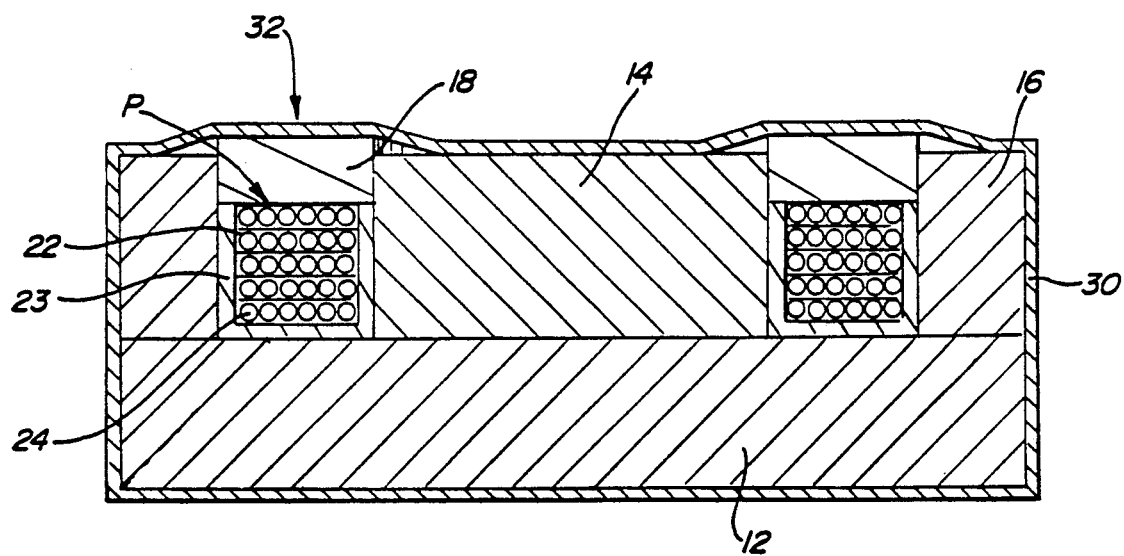
FIG. 3 is a schematic longitudinal cross-sectional view of the tooling of FIG. 1 with the preform therein enclosed in a gas impermeable envelope for hot isostatic pressing to consolidate the preform.

In lieu of consolidating the preform P in a vacuum hot pressing apparatus, the invention also envisions enclosing the tooling 10 with the preform P in the chamber 20 within a gas impermeable envelope 30 (e.g., a steel can), FIG. 3 and then hot isostatically pressing the enclosed assembly 32 of tooling 10 a nd preform P at an elevated temperature to cause the punch 18 to press the preform P into the consolidated composite C having a fully dense diffusion bonded metal matrix 25 with reinforcing filaments 24 disposed and diffusion bonded therein.

Upon cooling of the enclosed assembly of tooling 10 and consolidated composite C to ambient temperature either in the hot isostatic chamber or outside thereof, the steel can 30 is removed (e.g., machined or mechanically stripped (as a result of use of stop off materials to prevent bonding during the isostatic pressing cycle) from the tooling 10 and then the punch 18 is removed to free the composite C. Typically, the composite C is removed with the punch 18 as a result of being physically attached thereto during the consolidation step. Removal of the punch 18 and the composite C is greatly facilitated as a result of the differences between coefficients of thermal expansion of the various tooling components and composite C as described hereinabove. If necessary, the consolidated composite C and the punch 18 are separated by machining of the joined peripheries thereof to free the composite C from the punch 18.

Figure 2:
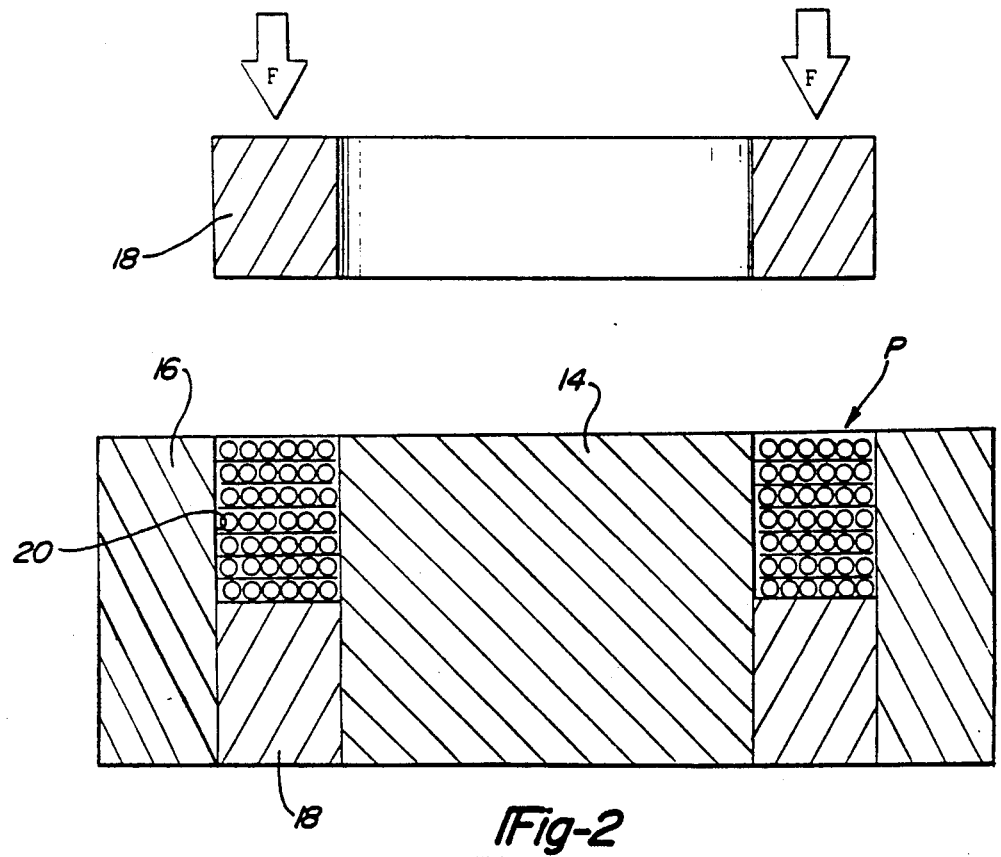
FIG. 2 is a schematic longitudinal cross-sectional view of another embodiment of the tooling of the invention.

FIG. 2 illustrates another embodiment of the invention wherein like reference numerals/letters are used for generally similar features of FIG. 1. The embodiment of FIG. 2 differs from that of FIG. 1 in having opposing annular punches 18 on opposite sides of the preform P, thereby eliminating the need for the rigid base 10. In this embodiment, the coefficient of thermal expansion of the inner central die member 14 is greater than that of the outer die member 16 and the ultimately formed composite C, FIG. 4. The thermal expansion coefficient of the opposing annular punches 18 likewise is greater than that of the outer die member 16 and the composite to be formed and preferably is generally equal to that of the central die member 14. In particular, the central die member 14 and the punches 18 are made of a nickel base superalloy (e.g., IN-100) while the outer die member 16 is made of the molybdenum TZM alloy when the preform P comprises alternate layers or tapes of Ti-6Al-4V metal matrix 22 and SiC filaments 24. The preform P is received directly in the annular chamber 20 without being received in an annulus like annulus 23 of FIG. 1.

Consolidation of the preform P is carried out in the manner described hereinabove; namely, in a hot vacuum pressing apparatus or in a hot isostatic compaction chamber with the tooling 10 and the preform P enclosed within a gas impermeable envelope (not shown but see FIG. 3).

While certain preferred embodiments of the invention have been described above, those familiar with the art will recognize that various modifications and changes can be made thereon for practicing the invention as defined by the following claims.

We claim:

1. A method for forming a filamentary reinforced metal matrix composite, comprising:
   (a) positioning a preform of said composite in an annulus that is made of said metal matrix, said annulus disposed in an annular chamber formed between a central die member and an outer die member, said central die member having a coefficient of thermal expansion greater than that of said outer die member and said composite to be formed in said chamber,
   (b) positioning an annular punch in said chamber,
   (c) pressing said punch against the preform in said chamber at an elevated temperature to consolidate said preform and said annulus into said composite, said central die member and outer die member having dimensions selected in conjunction with their coefficients of thermal expansion to apply a transverse compression on the preform during hot pressing to substantially prevent transverse bulging of the preform, and
   (d) removing said composite from said chamber at a temperature lower than said elevated temperature.

2. The method of claim 1 including forming the preform of alternating layers of metal matrix foil and filaments.

3. A method of forming a filamentary reinforced metal matrix composite, comprising:
   (a) positioning a preform of said composite in an annulus that is made of said metal matrix which is disposed in an annular chamber formed between a central rigid die member and an outer rigid die member,
   (b) positioning an annular rigid punch in the chamber to form an assembly,
   (c) enclosing the assembly in a gas impermeable envelope,
   (d) isostatically pressing the assembly at an elevated temperature to cause the punch to consolidate the preform and the annulus into said composite, (e) removing the envelope from said composite after step (d), and (f) removing said composite from said chamber.

4. The method of claim 3 wherein the central die member has a coefficient of thermal expansion greater than that of said outer die member and said composite to facilitate removal of said composite from said chamber at a temperature lower than said elevated temperature.

5. The method of claim 3 including forming the preform of alternating layers of metal matrix foil and filaments.

6. A method of forming a filamentary reinforced metal matrix composite, comprising:
   (a) positioning a preform of said composite in a chamber, said preform being surrounded on at least 3 sides by said metal matrix material;
   (b) applying pressure to the preform at an elevated temperature to consolidate the preform and the surrounding metal matrix into a composite.

7. The method of claim 6 wherein the chamber is formed by die members in a press.

* * * * *